(12) United States Patent
Bull

(10) Patent No.: US 8,810,452 B2
(45) Date of Patent: Aug. 19, 2014

(54) NETWORK LOCATION AND SYNCHRONIZATION OF PEER SENSOR STATIONS IN A WIRELESS GEOLOCATION NETWORK

(75) Inventor: Jeffrey F. Bull, Chalfont, PA (US)

(73) Assignee: TruePosition, Inc., Berwyn, PA (US)

( * ) Notice: Subject to any disclaimer, the term of this patent is extended or adjusted under 35 U.S.C. 154(b) by 309 days.

(21) Appl. No.: 12/786,166

(22) Filed: May 24, 2010

(65) Prior Publication Data

US 2011/0285589 A1  Nov. 24, 2011

(51) Int. Cl.
G01S 1/24 (2006.01)
G01S 5/02 (2010.01)
G01S 5/06 (2006.01)

(52) U.S. Cl.
CPC ..... *G01S 5/02* (2013.01); *G01S 5/06* (2013.01)
USPC .......................................................... 342/387

(58) Field of Classification Search
CPC ..................................... G01S 5/02; G01S 5/06
USPC .......................................................... 342/387
See application file for complete search history.

(56) References Cited

U.S. PATENT DOCUMENTS

| | | | | |
|---|---|---|---|---|
| 3,725,938 A | * | 4/1973 | Black et al. | 342/435 |
| 4,797,679 A | * | 1/1989 | Cusdin et al. | 342/387 |
| 5,155,490 A | * | 10/1992 | Spradley et al. | 342/357.44 |
| 5,327,144 A | * | 7/1994 | Stilp et al. | 342/387 |
| 5,960,355 A | * | 9/1999 | Ekman et al. | 455/456.1 |
| 6,101,178 A | | 8/2000 | Beal | |
| 6,230,018 B1 | * | 5/2001 | Watters et al. | 455/456.3 |
| 6,317,603 B1 | * | 11/2001 | Allison | 455/456.1 |
| 6,407,703 B1 | | 6/2002 | Minter et al. | |
| 6,445,927 B1 | | 9/2002 | King et al. | |
| 6,453,168 B1 | * | 9/2002 | McCrady et al. | 455/517 |
| 6,768,730 B1 | * | 7/2004 | Whitehill | 370/348 |
| 6,771,625 B1 | * | 8/2004 | Beal | 370/336 |
| 7,079,509 B2 | * | 7/2006 | Belcea | 370/330 |
| 7,427,952 B2 | * | 9/2008 | Bull et al. | 342/387 |
| 7,616,155 B2 | | 11/2009 | Bull et al. | |
| 7,627,327 B2 | | 12/2009 | Kennedy et al. | |
| 2003/0022675 A1 | * | 1/2003 | Mergler | 455/456 |

(Continued)

FOREIGN PATENT DOCUMENTS

WO    WO 2010/028278    3/2010

OTHER PUBLICATIONS

U.S. Appl. No. 12/642,058, filed Dec. 18, 2009, Bolon.

(Continued)

*Primary Examiner* — Frank J McGue
(74) *Attorney, Agent, or Firm* — Baker & Hostetler LLP

(57) ABSTRACT

Transmitters are located with a network of sensors by measuring signal characteristics at multiple known locations and processing these measurements at a central node. The sensors communicate their location to the central node along with measured characteristics of the transmitter's signal, and may be required to synchronize with other sensors. Often, GNSS receivers are utilized to locate and synchronize the sensors. However, the GNSS signals may be attenuated by obstructions. In this case, the sensors determine their location by making ranging measurements with sensors that can receive the GNSS signals. The waveform for the wireless backhaul permits this ranging. Additionally, many sensors can determine their location and time synchronize with the geolocation network through reception of signals from other sensors even if they do not have a direct connection to sensors that know their location and are time synchronized.

31 Claims, 12 Drawing Sheets

(56) References Cited

U.S. PATENT DOCUMENTS

| | | |
|---|---|---|
| 2003/0125046 A1 | 7/2003 | Riley et al. |
| 2004/0174900 A1 | 9/2004 | Volpi et al. |
| 2004/0242234 A1 | 12/2004 | Klenner |
| 2006/0003775 A1 | 1/2006 | Anderson |
| 2006/0181428 A1 | 8/2006 | Blaker et al. |
| 2006/0262011 A1* | 11/2006 | Bull et al. ............... 342/357.06 |
| 2006/0262731 A1* | 11/2006 | Carlson et al. ............... 370/252 |
| 2009/0164121 A1* | 6/2009 | Chen et al. ............... 701/213 |
| 2010/0120447 A1* | 5/2010 | Anderson et al. ............... 455/456.1 |
| 2011/0021210 A1* | 1/2011 | Medapalli et al. ............... 455/456.2 |
| 2011/0285589 A1 | 11/2011 | Bull |

OTHER PUBLICATIONS

International Patent Application No. PCT/US11/37306: International Search Report dated Jul. 2, 2013, 12 pages.

* cited by examiner

NETWORK LOCATION AND SYNCHRONIZATION OF PEER SENSOR STATIONS IN A WIRELESS GEOLOCATION NETWORK

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to the geolocation and time synchronization of blocked and/or blind, impaired sensor stations in geolocation networks via a wireless intra-sensor communications network.

BACKGROUND

First commercially deployed in 1998, overlay network-based wireless location systems have been widely deployed in support of location-based services including emergency services location.

Iterative geolocation of a radio emitter through the use of TDOA may include the use of a single portable geolocation (e.g., TDOA) sensor, a pair of portable geolocation sensor stations and three of more portable geolocation sensor stations. Adding portable geolocation sensor stations to the iterative process reduces the constraints on the signals to be located as well as providing a reduction in the number of iterations required to obtain improved location accuracy.

Passively determining the location of a transmitter requires that characteristics of its signal be measured at a number of distinct, and known, locations by sensor stations. This requires that the locations of the sensor stations in the geolocation network be known (e.g., each sensor station knows its own location or a central controller knows the location of each sensor station) and are time synchronized to each other, i.e. they operate on a common time base. The required precision of this time base is dependent on the location technique used.

Additionally, the sensor stations should provide the transmitter's signal characteristics (e.g. timing, power, angle, signal quality) to a central node, via a communication network, where they can be processed, along with the locations of the sensor stations, to determine the transmitter's location.

The location of sensor stations can be determined by a number of means including manual surveys, use of an internal Global Navigation Satellite System (GNSS) timing receiver or reception of transmissions from stationary transmitters of known location (e.g., a commercial or governmental timing beacon or a time and frequency stable transmissions such as those from High-Definition Television (HDTV) transmitters). However, in some impaired environments (e.g., where one or more sensor stations are blocked or blind), none of these techniques is available for determining the location of a sensor. A wireless communication network is often used for communications between the sensor stations and this wireless communication network can serve a dual purpose for sensor stations that are not able to determine their location with other techniques. In this specification, the terms GNSS and Global Positioning System (GPS) will be used interchangeably.

The inventive techniques and concepts described herein apply to well known wireless systems, which include the widely deployed time and frequency division multiplexed (TDMA/FDMA) radio communications systems including the widely used Global System for Mobile communications (GSM) and OFDM-based wireless systems such as Long Term Evolution (LTE), WiMAN (IEEE-802.16) and WiMAX (IEEE-802.20), as well as code-division radio communications systems such as CDMA (IS-95, IS-2000) and Universal Mobile Telecommunications System (UMTS), the latter of which is also known as W-CDMA. Further background information may be obtained from U.S. Pat. No. 7,616,155, Nov. 10, 2009, "Portable, Iterative Geolocation of RF Emitters," the disclosure of which is hereby incorporated by reference in its entirety.

SUMMARY

With proper design of the wireless communications waveform, a sensor that is not able to determine its location with other techniques can determine its location by reception of communications signals from at least three other sensor stations in the geolocation network that have determined their location and synchronized their clocks with either GPS or reception of transmissions from stationary transmitters sited at known locations. Once all sensor locations are known and time synchronization is accomplished over the intra-sensor communications network, location of mobile devices using radio geolocation techniques can be performed with the geolocation network.

An illustrative embodiment of the present invention is employed in connection with system for geo-locating transmitters of interest. The system comprises a network of geographically dispersed sensor stations including reference sensor stations and one or more blind sensor stations. The illustrative embodiment comprises a plurality of sensor stations, wherein at least three sensor stations are at a known location and are synchronized with a reference clock. The at least three sensor stations are useful as reference sensor stations. In addition, a central node is configured to control the sensor stations and a backhaul communications network is configured to permit wireless communications among the sensor stations and central node. The system is configured to employ the backhaul communications network and reference sensor stations for synchronization and geo-location of one or more blind sensor stations.

In another illustrative embodiment, a method for geo-locating transmitters of interest comprises determining the locations of at least three sensor stations and synchronizing the at least three sensor stations with a reference clock, and employing wireless communications via a backhaul wireless communications network to synchronize and geo-locate at least one blind sensor station. The wireless communications include broadcast by reference sensor stations of a wireless communications waveform that is received by the at least one blind sensor station and used for synchronization and geo-location.

In yet another illustrative embodiment, a method for geo-locating transmitters of interest involves a network of geographically dispersed sensor stations including reference sensor stations and at least one deficient sensor station. The deficient sensor station is at an unknown location, is not synchronized with the reference sensor stations, and does not have a direct radio connection to three or more reference sensor stations. The inventive method comprises determining the locations of at least three sensor stations and synchronizing these with a reference clock, thereby making the at least three sensor stations useful as reference sensor stations. In addition, the method employs wireless communications via a backhaul wireless communications network to synchronize and geo-locate a first deficient sensor station. This includes a broadcast by the reference sensor stations of a wireless communications waveform that is received by the first deficient sensor station and used for synchronization and geo-location. In addition, in preferred implementations, the first deficient sensor station makes a transmission time measurement for every sensor station to which it has a direct connection via the wireless backhaul communications network, including one or more reference sensor stations and at least one other deficient sensor station. Moreover, the at least one other deficient sensor station makes transmission time measurements for every sensor station to which the at least one other deficient sensor station is directly connected via the backhaul wireless communications network.

This summary is not intended to cover all of the inventive concepts described herein, and therefore other aspects of illustrative embodiments of the present invention are described below.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
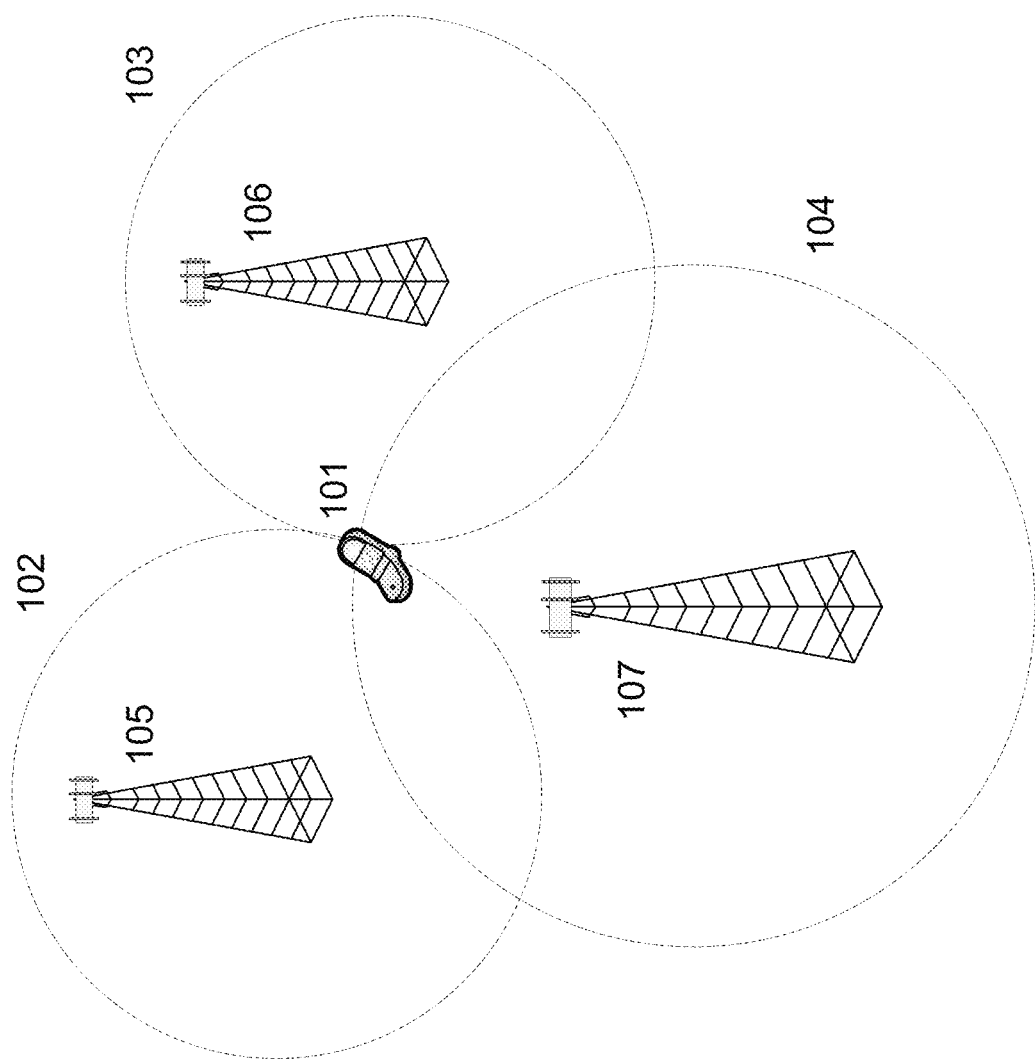
FIG. 1 graphically depicts transmitter geolocation via uplink or downlink signal based ranging utilizing time or power geolocation techniques.

We will now describe illustrative embodiments of the present invention. First, we provide a detailed overview of the problem and then a more detailed description of our solutions.

A network of sensor stations can use Power-of-Arrival (POA), Power-Difference-of-Arrival (PDOA), Time-of-Arrival (TOA), Time-Difference-of-Arrival (TDOA) or hybrids of TOA, POA, TDOA, PDOA and/or Angle-of-Arrival (AoA) to geolocate wireless transmitters in two dimensions when three or more sensor stations in the network receive the transmitter's signal and the sensor stations are at known locations and are time synchronized. A precise synchronization between all sensor stations is required to enable the time based methods, including Time-of-Arrival (TOA) or Time-Difference-of-Arrival (TDOA) methods. A relatively imprecise common time base suffices for the Power-of-Arrival, Power-Difference of Arrival (PDOA) and Angle of Arrival (AOA) methods. Hybrid methods combining a time and power, time and angle, or time power and angle require precise time synchronization. Use of more than three sensor stations that receive the signal in the location solution increases the accuracy of the location estimate. The Global Navigation Satellite Systems, such as the NavStar Global Positioning System (GPS) satellite system, is often used by the sensor stations to determine their location as well as synchronize them in time and frequency. However, the GPS receiver in a sensor station requires a fairly unobstructed view (minimally attenuated, reflected, refracted signal path) of multiple satellites to determine its location as well as get time and frequency synchronized. Many environments do not permit the reception of a sufficient number of GPS satellites to permit some sensor stations in the network to determine their location or synchronize in time. These sensor stations can receive transmissions from other sensor stations that know their own location (or whose locations are known by the system) and are time synchronized to a common clock. The sensor stations in the location network that know their location and are time synchronized are known as "reference" sensors or reference sensor stations.

The sensor stations that do not have knowledge of their own location and are not time synchronized are known here as "blind" sensor stations. Sensor stations that cannot communicate directly to the central node are known here as "blocked" sensor stations. A sensor station that can communicate directly with the central node is a "direct" station. A "deficient" sensor station is "blind" and does not have a direct radio connection to three or more reference sensor stations. Blocked applies to the communications path while deficient applies to the radio paths.

In an illustrative system in which the present invention may be deployed, sensor stations are able to determine their location and synchronize their time clock with all of the other sensor stations in the geolocation network. This can be achieved by incorporating GPS location and timing receivers into the sensor or an equivalent location and timing receiver based upon terrestrial signals. If these signals cannot be received by a sensor then it is "blind" and must utilize another technique to determine its location and achieve time synchronization with the geolocation network. The backhaul communications network can be designed to overcome this disadvantage through the use of "reference" sensor stations, i.e. sensor stations that can determine their position and synchronize in time through the use of GPS or terrestrial signals. The reference sensor stations act, in essence, as pseudolites to the blind sensor stations. Blind sensor stations that have a direct radio connection to three or more reference sensor stations can, therefore, self locate and achieve time synchronization with the geolocation network. Blind sensor stations that do not have a direct radio connection to three or more reference sensor stations, i.e. they are "deficient", but do have an indirect connection to three or more reference stations may be able to be located and synchronized to the geolocation network by providing information on signals it can receive from the direct connection to its neighbors to the central node. The central node will process information from all of the sensors in the geolocation network, determine the location of blind ones and time synchronize them to the geolocation network. In effect, the wireless backhaul network serves two purposes. The first purpose is to provide communications connectivity to all sensor stations in the geolocation network so that they may be controlled by a central node and provide the data they collect to the central node. The second purpose is to permit blind sensor stations to determine their location and achieve time synchronization through connectivity to reference sensor stations.

A wireless geolocation network employs a central node to control the sensor stations and to receive the measurements the central node commanded them to make. The central node operates upon these measurements to determine a location estimate. The central node also acts as the interface to external systems that trigger geolocations and displays the resulting location estimate. Any particular sensor station can also act as the central node. The sensor station that is the central node can also change over time.

A wireless geolocation system is typically triggered to determine the location of a transmitter's signal. Typically, the trigger will specify the time(s) and frequencies at which the sensor stations will acquire the transmitter's signal. It may also specify other parameters to identify the signal of interest. For example, in CDMA systems this could be the spreading code(s). The trigger could come from an external source. For example, the wireless network the transmitter is operating on. The location trigger could also be determined by the central node or one of the sensor stations. As another example, a sensor that receives a signal above a specified power level at a specific frequency and time period could generate a trigger to all of the other sensor stations in the geolocation network. See, e.g., U.S. Patent Publication US 2006/0003775 A1, "Advanced Triggers for Location-based Service Applications in a Wireless Location System," filed on Jun. 10, 2005.

The location of fixed reference sensor stations can also be determined with a manual survey. Time synchronization for a fixed reference sensor can be achieved by receiving the transmissions from at least one GNSS satellite or from a geostationary Wide Area Augmentation System (WAAS) or from a ground-based, terrestrial timing signal from a known location. A GNSS receiver provides this functionality. GNSS receivers solve for 4 unknowns; Latitude, Longitude, Altitude and Time. When less than 4 satellite broadcasts are available, the GNSS (e.g. GPS) receiver can still produce a highly accurate timing signal and frequency reference provided one satellite signal (GNSS or WAAS) is available and the receiver location and altitude is precisely known.

Although the use of power-difference-of-arrival (PDOA) and time-difference-of arrival (TDOA) are used as operative examples throughout this specification, some or all sensor stations may also be equipped with Angle-of-Arrival (AOA) equipment and functionality. Use of AOA, time-of-arrival (TOA) and power-of-arrival (POA) techniques in the location calculation of either the sensor station or mobile-of-interest (MOI) are also not precluded. (The terms "mobile-of-interest" and "transmitter-of-interest" are used herein to refer to transmitters whose locations are to be determined, e.g., by a wireless geo-location system. The term "mobile" implies that the transmitter is not necessarily at a fixed location. In some cases, a mobile transmitter may be a portable unit or even a fixed unit used intermittently.) Hybrids of all the discussed location techniques are likely to be implemented in a deployed geolocation network. Frequency Difference of arrival (FDOA) will be implemented to compensate for moving sensor stations and moving mobiles of interest. Additionally, some geolocation techniques, such as POA and PDOA, do not require extremely accurate time synchronization between sensor stations.

The term "cell site" is used as a generic term to describe a transmission site or beacon used when the signal collection is performed at the mobile device (a downlink-based location system). A cell site may be a dedicated facility or the radio access network (RAN) subsystem of a wireless communications network (WCN). A cell site may also have a co-located or integrated sensor station to collect signals for an uplink-signal wireless location technique.

FIG. 1 is a geographical illustration of the unique location determination of a mobile transmitter via Power-of-Arrival (POA) or Time-of-Arrival (TOA) geolocation techniques. The unique location of the mobile device 101 is illustrated by the common intersection of the three circles 102 103 104. The range circles 102 103 104 are each centered upon each of the three geographically separated sensor stations 105 106 107. The perimeter of each circle 102 103 104 represents a range (a contour of constant distance) from each sensor station 105 106 107.

POA ranges and the transmitter's location are derived by measuring the power and utilizing a propagation model to calculate the radial distance the transmitter is from each of the sensor stations.

TOA geolocation ranges and a location are derived by measuring time delays and using the speed of radio wave propagation to calculate the radial distance the transmitter is from each of the sensor stations. When sensor stations are precisely synchronized, geolocation based on TOA with a constant time offset (as is used in the GPS system) is possible.

Figure 2:
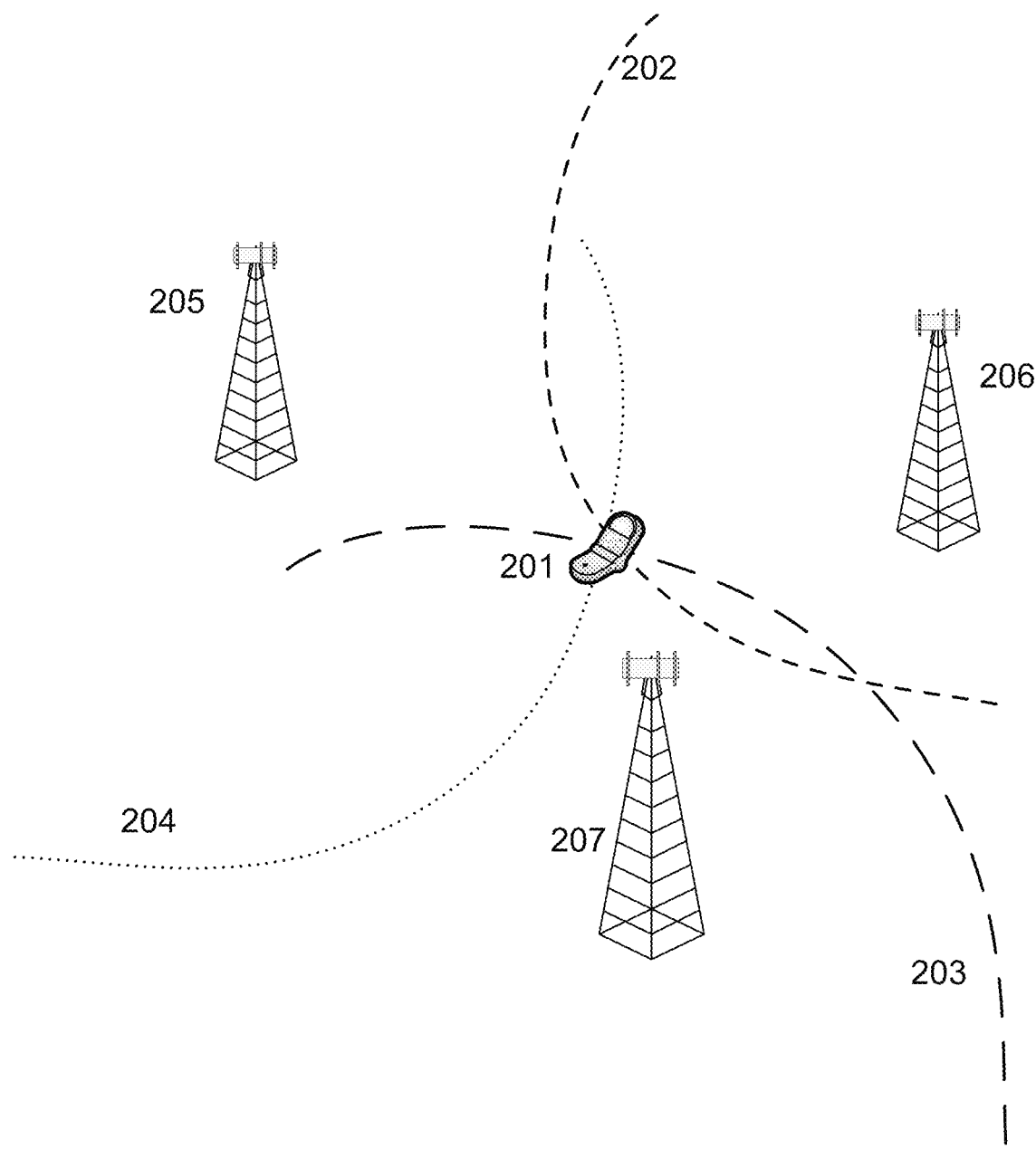
FIG. 2 graphically depicts transmitter geolocation via time and/or power difference of arrival geolocation techniques via uplink or downlink signals.

FIG. 2 is a graphical illustration of the unique location determination of a mobile transmitter via a PDOA or TDOA geolocation technique. A set of geographically distinct sensor stations 205 206 207 is shown. The unique location of the mobile device 201, i.e. the transmitter, is illustrated by the common intersection of hyperbolas. Each hyperbola 202 203 204 represents a contour of constant differences in distance from the pair of sensor stations located at the foci of the hyperbolas. For PDOA this is derived by measuring the difference in power between the pair of sensor stations at the foci and converting this power difference to a distance difference with a propagation model. For TDOA this is derived by measuring the difference in time the mobile's signal is measured at the pair of sensor stations at the foci and converting this to distance using the speed of radio wave propagation.

Figure 3:
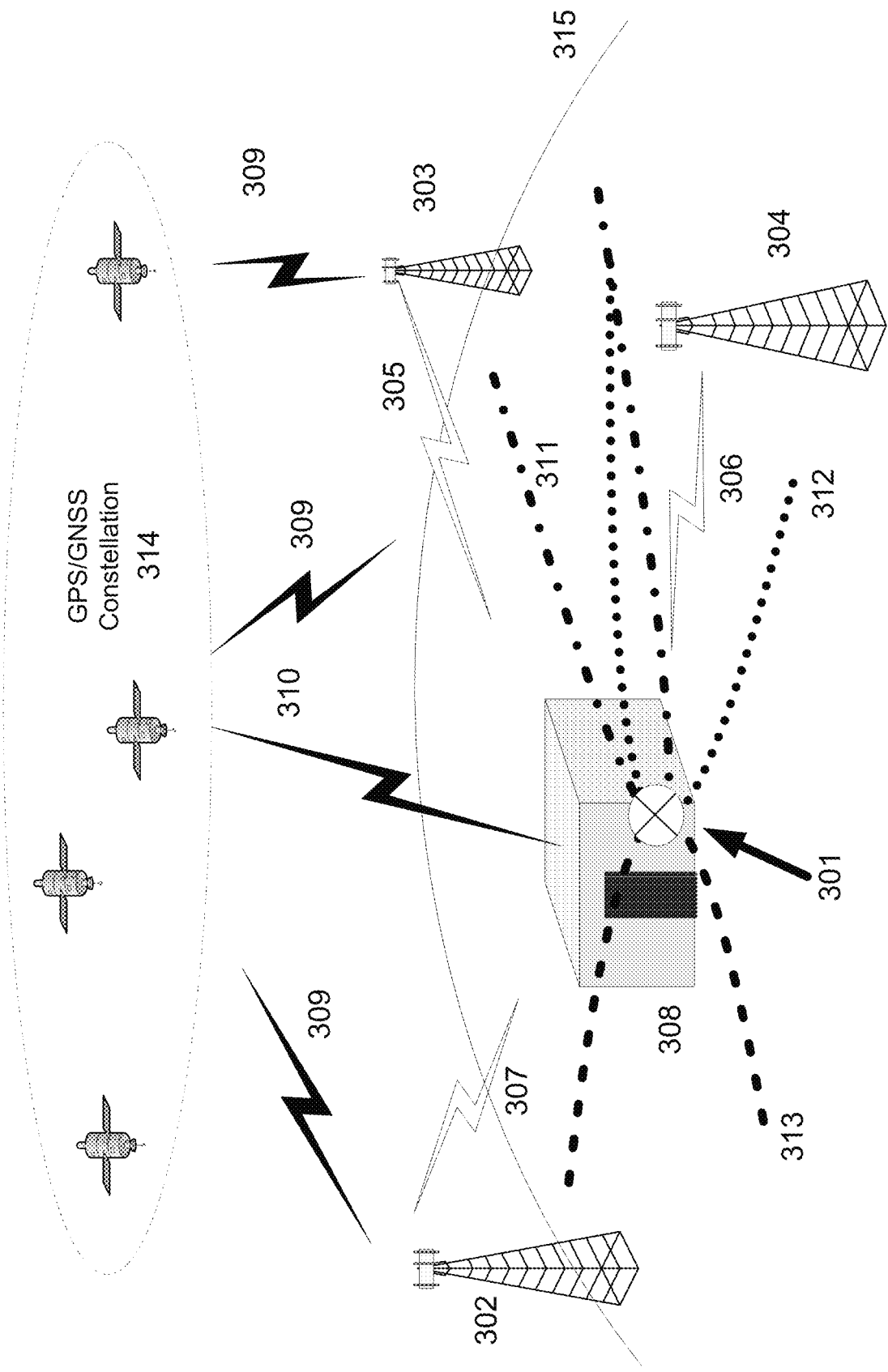
FIG. 3 illustrates location of a blind sensor station when obstructed from satellite positioning.

FIG. 3 illustrates how a single "blind" sensor 301 can determine its own location and time synchronize to the other sensor stations in the network 302 303 304 by receiving wireless signals 305 306 307 from at least three "reference" sensor stations 302 303 304 that know their location and are time synchronized to the geolocation network. In the FIG. 3 illustration, time synchronization and self-location are determined at each reference station 302 303 304 from unobstructed satellite-broadcast navigation signals 309 provided by the satellite constellation 314.

The blind sensor 301 cannot access the attenuated or obstructed satellite-provided radio signals 310 provided by the satellite constellation 314 and must rely upon an alternative technique to determine its location and synchronize in time. In effect, the "reference" sensor stations act as pseudo-lites to the "blind" sensor via the wireless backhaul.

Two fundamental requirements of the sensor stations for the illustrative wireless geolocation system described herein include knowledge of their locations and time synchronization. Both of these requirements can be satisfied by including a GPS timing receiver with each sensor. GPS timing receivers receive the signals from GPS satellites orbiting the earth to determine their location and provide a time and frequency reference. However, GPS satellite signals levels are low and can be attenuated by obstructions which prevent their use. The wireless communications system employed for inter-sensor communications can be used to determine the location of the sensor that cannot receive GPS as well as synchronize it in time.

The pseudolite concept is taught in U.S. Pat. No. 6,771,625 and U.S. Pat. No. 6,101,178, both entitled, "Pseudolite-augmented GPS for locating wireless telephones". Both of these patents are held by the assignee of this application.

Ground-based reference sensor stations act as pseudolites to support accurate determination of sensor locations by broadcasting CDMA signals interleaved by a TDMA system. Pseudolites synchronize signal transmissions with an accurate timing reference, such as can be derived from GPS satellites. Adjacent pseudolites broadcast CDMA signals at different times, eliminating near-far signal interference between pseudolites. Blind sensor stations receive and determine the TOA of the pseudolite signals. A location processor associated with the blind sensor may access an internal database of pseudolite locations, or pseudolite geo-location information may be encoded in pseudolite transmissions. The location processor uses pseudolite geo-location information and TOA to determine sensor locations and time synchronize them to the geolocation network. The TDMA pseudolite-based system may augment the GNSS (such as GPS) to provide more accurate geo-location information than is available from the GNSS alone.

Figure 4:
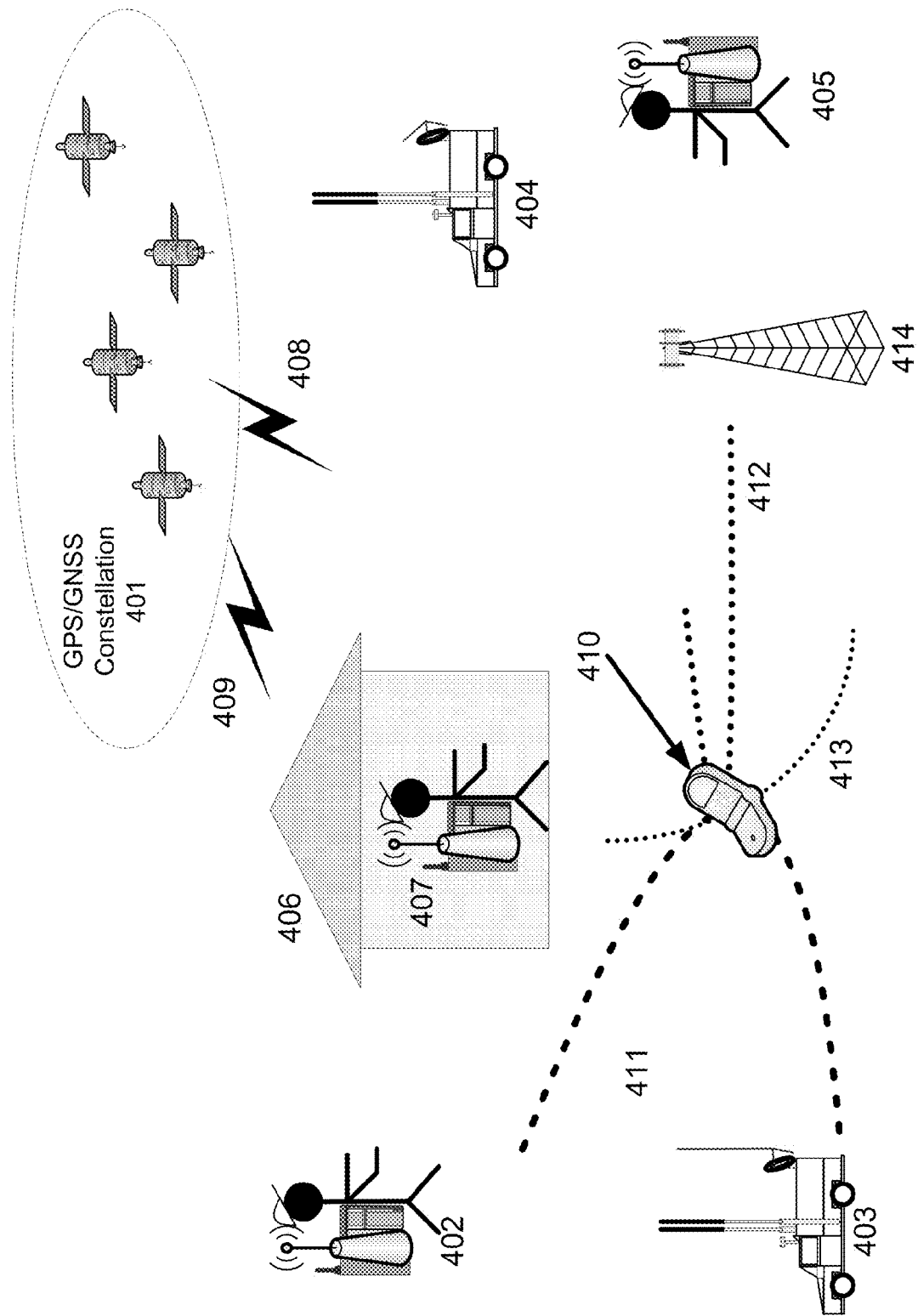
FIG. 4 depicts location of a transmitter using both sensor stations positioned by satellite positioning and sensor stations positioned by the sensor network.

FIG. 4 illustrates an example deployment of a portable iterative geolocation system with mixed reference and blind sensor stations. FIG. 4 illustrates reference sensor stations that can receive GPS signals and a blind sensor that cannot receive GPS signals but can determine its location and synchronize in time via three reference sensor stations it can receive via it wireless backhaul. Additionally, it shows the central node getting an external location trigger and all of the sensor stations in the geolocation network receiving the signal-of-interest (SOI) and providing characteristics of it to a central node (not shown) which calculates and displays the location and provides it to an external entity.

The multiple sensor stations are distributed about a geographic area to receive the signal transmitted by the target. The geometric arrangement of these sensor stations with respect to the transmitter to be located, i.e. the target, will impact the accuracy with which the target can be located. This is called the Geometric Dilution of Precision (GDOP). Best accuracy is obtained when the sensor stations completely surround the target. The minimum number of sensor stations that must receive the signal from the transmitter is three for a two dimensional location estimate and four for a three dimensional location estimate (if mobile transmitter's time of transmission is unknown). Location accuracy can be further improved when more than the minimum required sensor stations can receive the transmitter's signal and participate in the location through the use of an over-determined solution. Sensor stations must know their location when acquiring the target's signal. Static sensor stations' locations can be manually surveyed or a GPS receiver can be incorporated into the sensor to accurately determine their location. Other geolocation receivers that utilize digital TV broadcasts can be used as well. Sensor stations that utilize these auxiliary receivers to determine their location can, therefore, be portable. For time based geolocation techniques the sensor stations must be accurately time synchronized and acquire the signal from the target either simultaneously or iteratively (as described in U.S. Pat. No. 7,616,155). Auxiliary receivers in the sensor stations can also synchronize the sensor stations in time.

In FIG. 4, the GNSS constellation 401 provides satellite broadcasts 408 allowing many of the deployed sensor stations 402 403 404 405 to self locate and synchronize to a common system time such as an offset from Greenwich Mean Time (GMT) or Coordinated Universal Time (UTC). Some sensor stations 407 are obstructed (in this example, by the building structure 406) from receiving a sufficient number of satellite signals 409 to self-locate or time synchronize. These blind station(s) 407 can then be located by network means (as shown in FIG. 3) and still contribute to the locating of the mobile transmitter 410 in a wireless communications network 414. In the FIG. 4 illustration, TDOA with its superior performance in an urban environment is shown with TDOA hyperbolas 411 412 413 intersecting at the geographic location of the mobile device 410.

An example wireless geolocation network deployment is shown in FIG. 4 and is comprised of: Multiple reference sensor stations; Blind sensor stations (any sensor stations without sufficient radio signals to self-determine position or timing from the GNSS constellation, WAAS, or terrestrial broadcast networks), Backhaul Communications System, Central Processing Node/External Interface, Display/Control Device.

Figure 5:
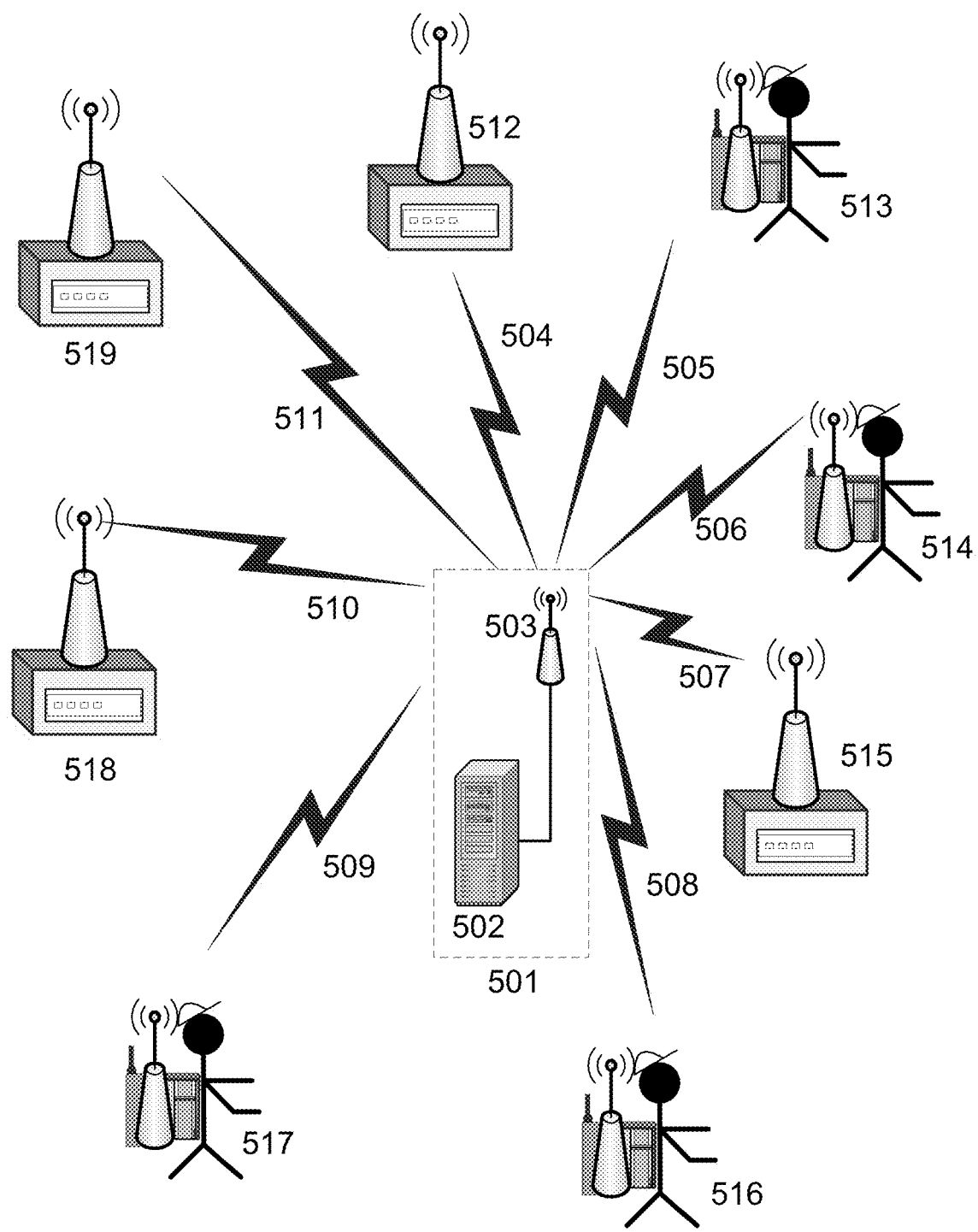
FIG. 5 shows direct communications between the central node and the sensor stations.

Sensor stations in a wireless geolocation system must possess a communications method so that they can be controlled, i.e. commanded, to receive the signal from the transmitter at a specific time, as well as provide the characteristics of the signal received to a common, central node where they can be processed to determine the transmitter's location. Ideally, a "star" communications topology, as shown in FIG. 5 would provide communications signaling 504 505 506 507 508 509 510 511 between the fixed sensor stations 512 515 518 519, mobile sensor stations 513 514 516 517 and the central node 501. The central node 501 here is shown as a central host computation platform 502 and a wireless transceiver station 503 allowing server 502 to be located either locally or remote to the wireless transceiver station 503. Not shown are the display, database storage and collateral information available at the central node. For instance, the central node may have an associated Location Intelligence Management System (LIMS) (see U.S. patent application Ser. No. 12/642,058, filed Dec. 18, 2009, "Location Intelligence Management System") either locally or remote and connected via a wide-area-network. The LIMS is a data capture, storage and decision support system that utilizes available data (both past and real time) from multiple sources (such as wireless networks, wireless location network, and off line sources such as network information, geographic information, manually entered information and geo-spatial data) to optimize utilization (scheduling and selection) of wireless location resources across multiple users and entities to produce location-aware intelligence. The LIMS contains the algorithms, control logic, data storage, processors and input/output devices to analyze past and real time data obtained from multiple sources in combination or separately, to produce intelligence in the form of metadata not otherwise reasonably or easily obtained. These algorithms can iteratively use previous generated metadata to automatically contribute to new analysis, which will use both real data (past and real time) as well as metadata. Such analysis would produce information such as: identifying potential behaviors of interest, identifying specific mobile users associated with such behaviors of interest, associations between mobile device users and mobile device user identification when no public ID is available (such as with prepaid mobile devices).

Often, however, a wireless communications backhaul is utilized for portability and the central node may not have direct wireless connectivity to all of the sensor stations. This disadvantage can be overcome through the use of a mesh communications network as shown in FIG. 6 where sensor stations that have connectivity with both the central node and sensor stations that cannot see the central node can act as a relay.

Figure 6:
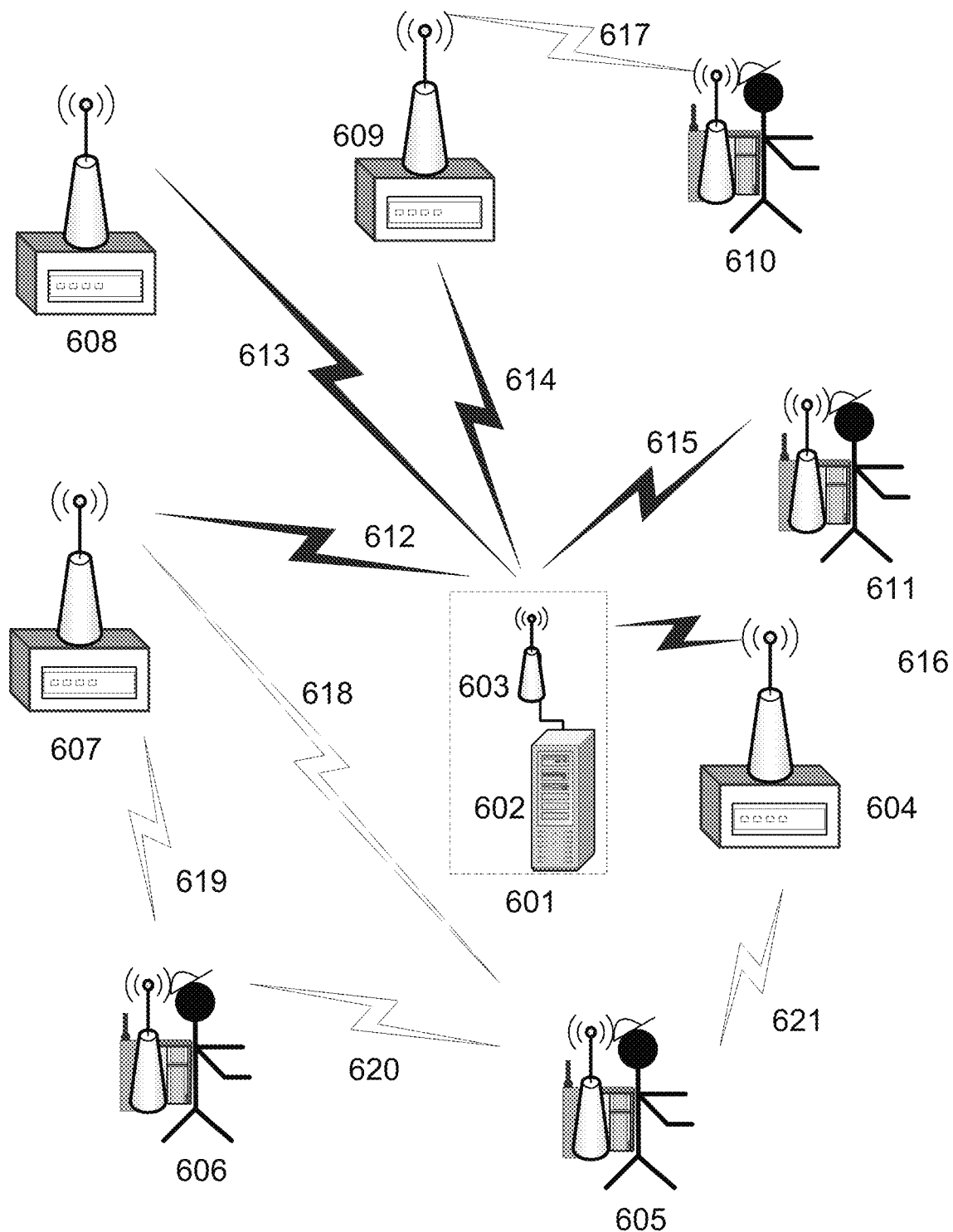
FIG. 6 shows a mixed network for sensor stations either in direct communications with the central node or sensor stations relayed through intermediate stations.

FIG. 6 illustrates how in real world environments the central node may not be able to communicate directly with all of the sensor stations in the geolocation network, i.e. some sensor stations are "blocked" ones. A mesh communications network, however, provides a path, via relay, through sensor stations that the central node does have a direct communications connection with, providing daisy-chained communications between blocked sensor stations and the central node.

In the example deployment depicted, the server 602 in the central node 601 uses its associated transceiver facility 603 to communicate with the deployed sensor stations. Direct links 612 613 614 615 616 are formed between the central station 601 and the unblocked stations 604 607 608 609 611. Using the databased knowledge of the deployed sensor stations and the direct radio link(s), the central server 602 then orders all directly connected sensor stations 604 607 608 609 611 to conduct a search of the air interface for the missing, presumed blocked sensor stations 605 606 610. Once the missing/blocked sensor stations 605 606 610 are discovered, the discovering sensor acts as a relay between the central node 601 and the formerly missing stations. A relay may be one-hop with the discovering station 609 the only intermediary between the blocked station 610 and the central node. A relay may be multi-hop with multiple intermediate stations 607 606 a blocked station 605 and the central node 601. A relay may have multiple connections where the blocked station 605 can use or select from the best of multiple relay connections 618 620 621.

Figure 7:
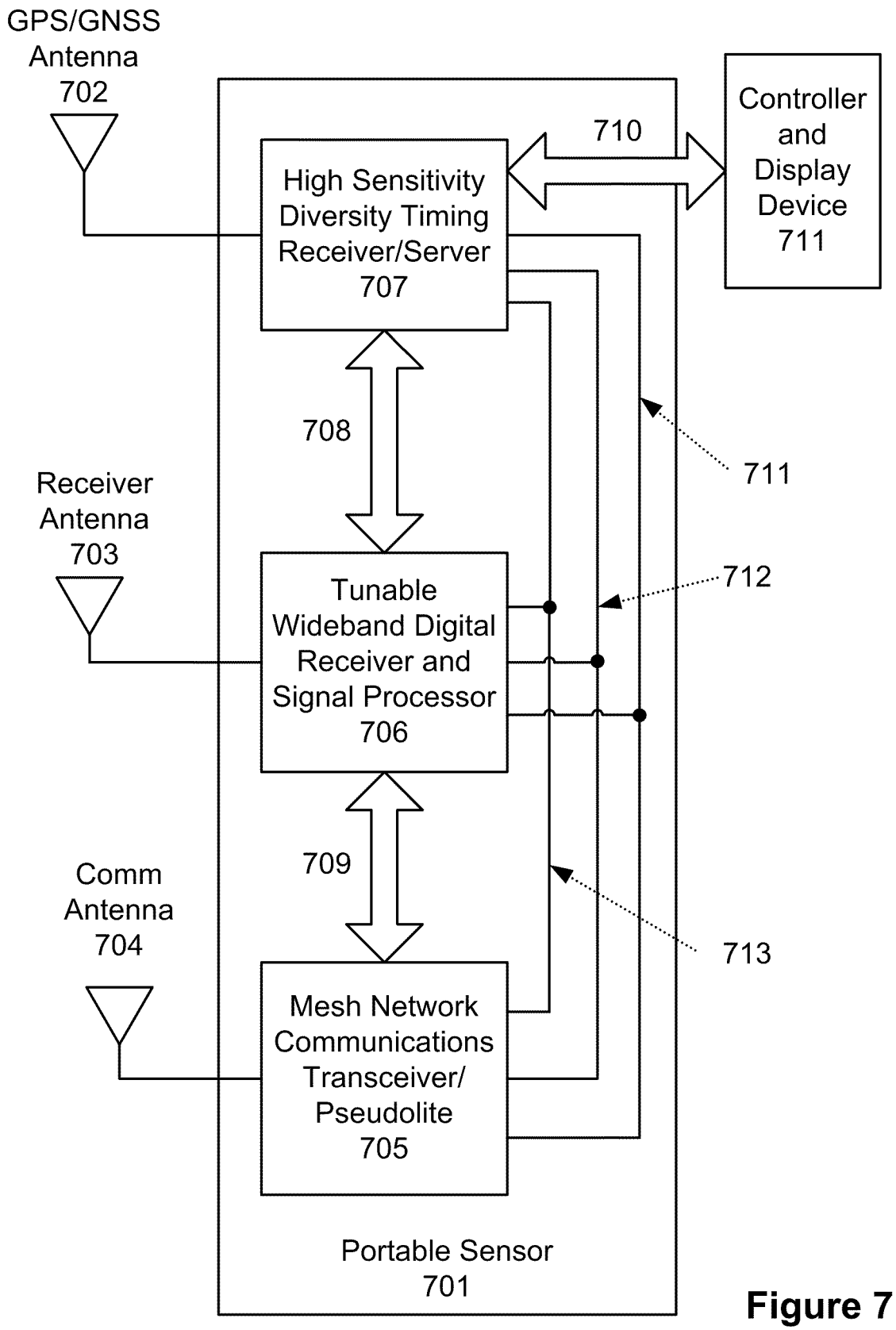
FIG. 7 schematically depicts the major subsystems in an embodiment of a portable sensor station(s).

A sensor in a geolocation network will typically need to know its location and synchronize in time with the other sensor stations in the geolocation network when acquiring the signal of the transmitter to be located. A block diagram of a sensor is shown in FIG. 7. The portable sensor 701 is comprised of a number of antennas 702 703 704, receivers 707 706 and transceiver 705, internal communications links between the subsystems 708 709 711 712 713 and an optional controller and display device 711 with interconnection between the subsystems via internal digital communications links 710. The high sensitivity diversity timing receiver/server 707 receives GNSS signals from satellites above the earth or from terrestrial broadcast stations (either purpose built systems or with high uptime quality of service such as High definition television (HDTV) stations), to enable the determination of the location of the sensor and provide time and frequency synchronization for the sensor when these signals are available. The RF signals from the transmitters that are to be located are received with the signal antenna and provided to the multichannel tunable wideband digital receiver and signal processor. Once the signals are acquired they can be processed with the signal processor and the results provided to the central node. A mesh network communications transceiver provides communications between the sensor and other sensor stations including the central node. When a sensor knows it location and is time synchronized to the common clock of the geolocation network it can serve as a pseudolite for blind sensor stations that it can communicate with directly. The controller and display devices permit control of the sensor and display of its location, location of other sensor stations as well as locations of targets on a map or other overhead image.

Figure 8:
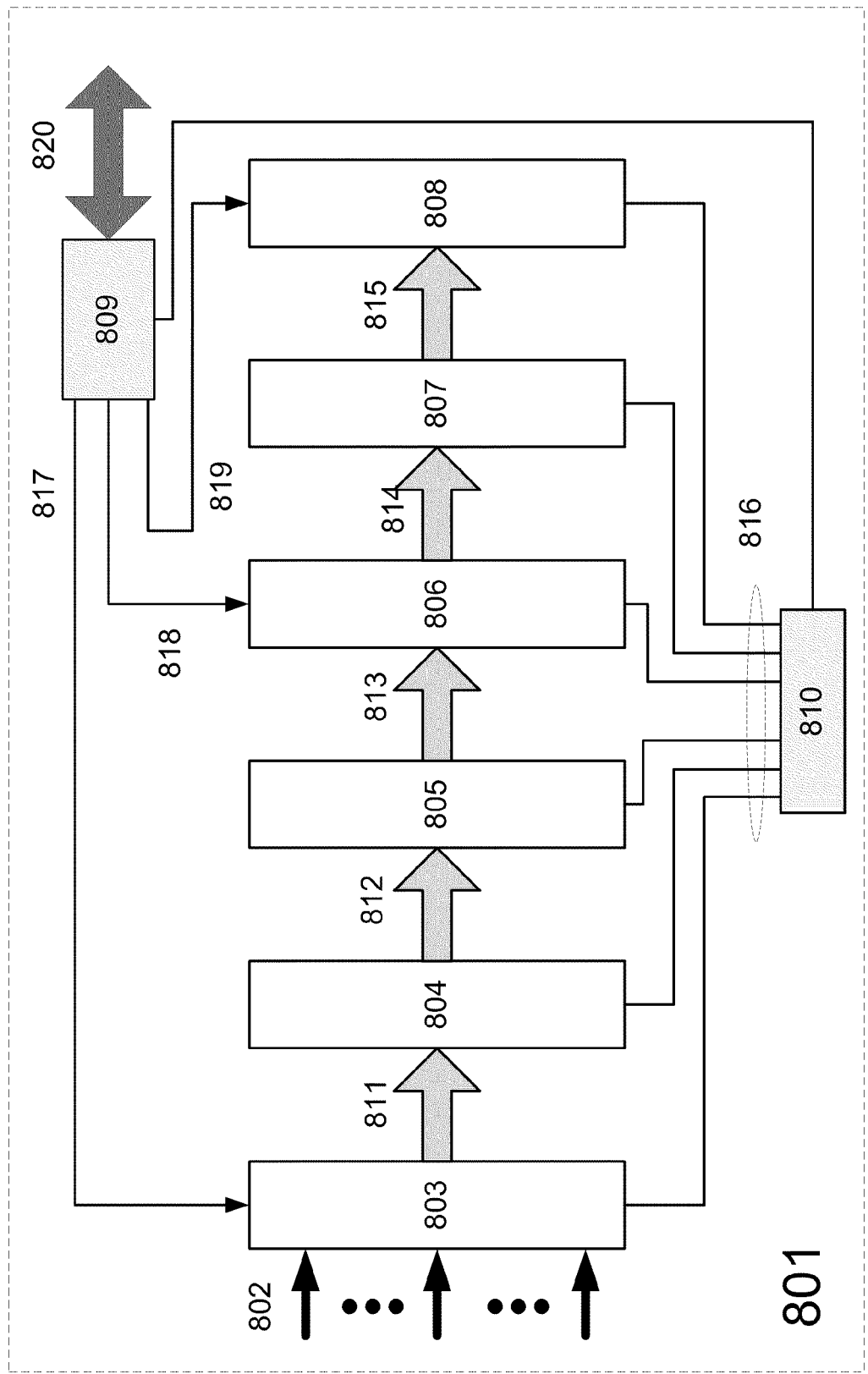
FIG. 8 depicts the functional elements within a sensor station's multi-channel, tunable wideband digital receiver and signal processor subsystem.

The multichannel tunable wideband digital receiver and signal processor is the central subsystem of the sensor station. The block diagram of the functional elements of a representative Multichannel Tunable Wideband Digital Receiver and Signal Processor Subsystem 801 of the Sensor station is depicted in FIG. 8. The functional elements depicted are: Radio Frequency/Intermediate Frequency (RF/IF) subsystem 803, Analog to Digital conversion subsystem (A/D) 804, First Memory Buffer subsystem 805, Digital down converter (DDC) subsystem 806, Second Memory Buffer subsystem 807, Digital Signal Processing (DSP) subsystem 808, Control Processor subsystem 809, and Clock distribution subsystem 810. The receiver antenna(s) connection(s) 802 are shown, but the receiver antenna are not.

The RF/IF subsystem 803 converts multiple channels of RF signals 802 to an intermediate frequency (IF) signal 811. RF/IF subsystem 803 does this by accepting RF signals 802 from antenna(s), bandpass filters them to reject signals outside of the appropriate RF band they are operating and then amplifying the remaining signals. The remaining signals are then translated in frequency to an intermediate frequency where they are again filtered with a bandpass filter to reject unwanted mixing components and noise. The resultant signals are again amplified with a buffer amplifier before being input to the next stage. The multiple channels may receive the same set of RF frequencies from multiple antennas or receive a different sent of RF frequencies from one or multiple antennas. This, for example, would permit reception of both uplink and downlink signals of a wireless telecommunications network. Often, the downlink signals of a wireless telecommunications network are monitored to synchronize to the timing of it. The RF/IF subsystem may possess a single local oscillator that is driven by the frequency reference or multiple local oscillators, as many as one per channel, again tied to the frequency reference for frequency stability.

The processed signals 811 from the RF/IF subsystem 803 are input to the Analog-to-Digital Conversion (A/D) subsystem 804. The A/D subsystem 804 possesses an A/D converter for each received radio channel. All of the A/Ds are clocked simultaneously with the sampling clock derived from the frequency and time reference. Each A/D will convert the analog signal from a channel of the RF/IF subsystem 803 to a digital format with each sample comprising a number of bits. The multiple channels of digital samples 812 are provided to a first memory buffer 805 which can provide a configurable amount of delay between its input and output. Optionally, the first memory buffer 805 can be configured as a circular ring buffer.

The digital downconverter (DDC) subsystem 806 accepts multiple channels of wideband digital samples 813 that are centered at the intermediate frequency and translates them to baseband in-phase and quadrature samples that have been further bandpass filtered, translated in frequency and their output sample rate reduced. In effect, the DDCs permit tuning to specific channels of specified bandwidth with the sample rate reduced to be more consistent with the channel bandwidth. The DDC subsystem 806 will possess multiple DDCs. There may be a one-to-one correspondence between the number of DDCs and the RF/IF channels. Or there can be multiple DDCs assigned to a single RF/IF channel permitting the reception of multiple narrowband frequency channels derived from a single wideband RF/IF channel. The digital output 814 of the DDC subsystem 806 inputs a second memory buffer 807. The multiple channels of digital samples 814 are provided to the second memory buffer 807 which can provide a configurable amount of delay between its input and output. Optionally, it can act as a circular buffer to permit geolocation of transient signals after they have occurred.

The DSP subsystem 808 takes the digital samples 815 from the buffer memory 807 as produced by the DDC subsystem 806, and processes the samples in various ways. The types of processing can include:
  Detection
  Demodulation
  Correlation
  Spreading/Despreading
  Coding/decoding
  Equalization
  Signal Reconstruction
  Location determination The control processor subsystem 809 acts as the external interface 820 to the outside world for the sensor station, receiving and sending commands and information through the receiver's internal digital interfaces 817 818 819. Additionally, control processor subsystem 809 configures each of the subsystems in the receiver 801 as well as other subsystems in the sensor station.

Synchronization of time and, optionally, frequency between the sensor stations is important for geolocation. The clock synchronization subsystem 810 accepts the time and frequency reference provided by either the timing receiver, for a reference sensor, or from the central node via the mesh communications transceiver if a blind sensor, and generates the required timing signals 816 for the other subsystems within the receiver 801.

Additionally, control processor subsystem 809 configures each of the subsystems in the receiver as well as the timing receiver/server and the mesh communications transceiver.

Figure 9:
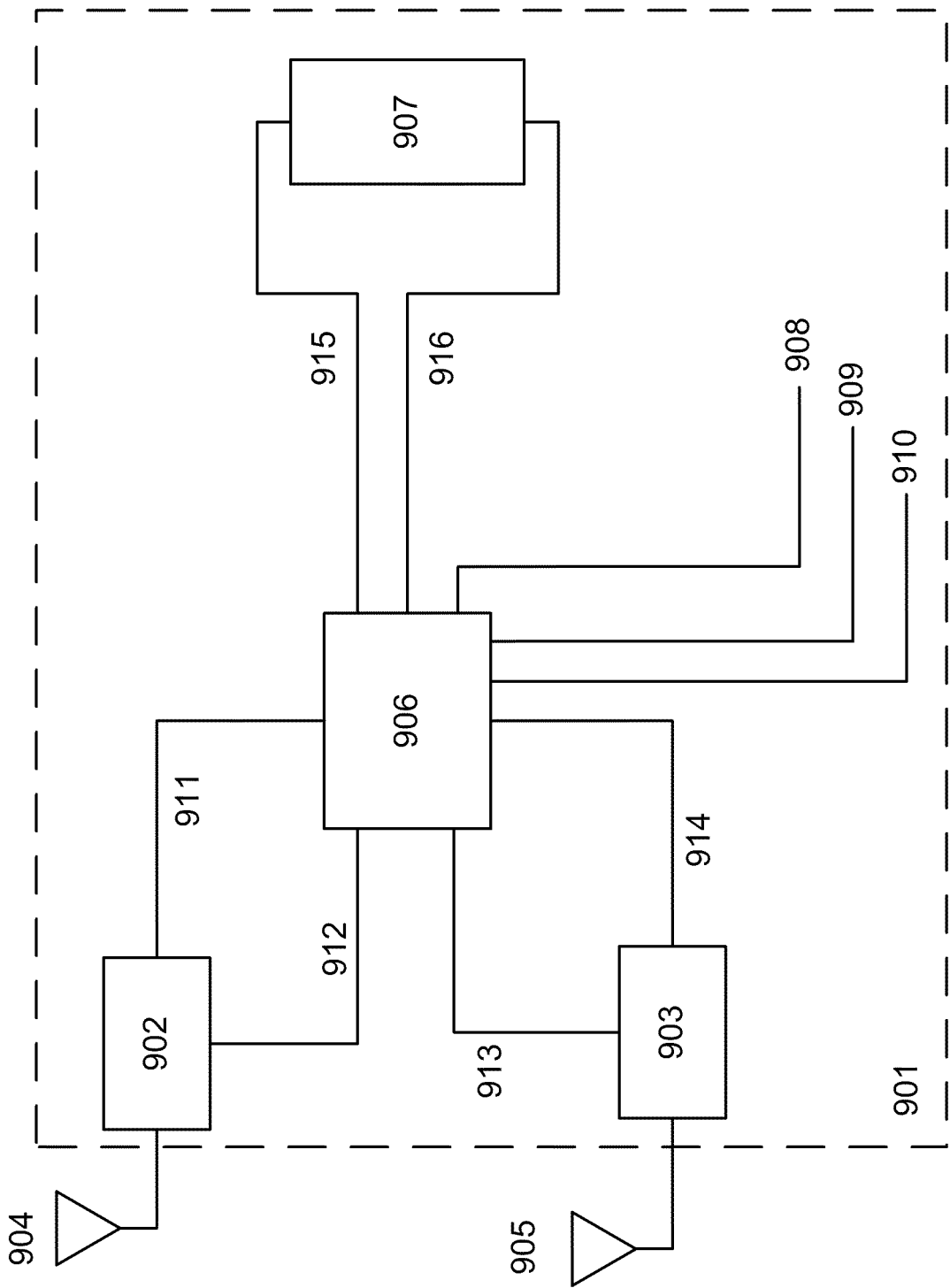
FIG. 9 depicts the functional elements within a sensor station's diversity timing, location and frequency synchronization receiver subsystem.

The major functional elements of the diversity timing, location and frequency synchronization receiver subsystem used in both the sensor stations and central node is depicted in FIG. 9. A diversity receiver (Time and Frequency Synchronization Unit) 901 generates position, time and frequency references for use in locating and synchronizing the sensor stations in the geolocation network. As shown in FIG. 9, the diversity receiver 901 a satellite broadcast receiver 902 with associated antenna 904 and a second receiver subsystem comprising a terrestrial broadcast receiver 903 with associated antenna 905 and a common processor platform (CPP) 906 coupled via control 911 and data 912 digital links to the satellite broadcast receiver 902 and to the terrestrial broadcast receiver 903 via control 913 and data 914 digital links. The CPP in turn is associated with a reference oscillator 907 the CPP trains via control link 915 and reads via data link 916.

The diversity receiver 901 is served by at least one antenna array, preferably one antenna 904 905 for each receiver 902 903.

The satellite broadcast receiver subsystem 902 provides a stable time reference and signal information used for positioning to the CPP via the data 912 digital link(s). The terrestrial broadcast receiver 903 also provides time reference and signal information used for positioning to the CPP using associated the digital data link(s) 914.

The CPP, in turn, uses the signal information provided by the satellite 902 and terrestrial receivers 903 to formulate the system time, frequency references and location data for the diversity receiver 901. Data links output the system time 908, frequency reference(s) 909 and location data 910 to the other subsystems of the sensor station or central node.

In a more specific illustrative embodiment of the diversity receiver, the terrestrial broadcast receiver comprises a HDTV receiver. The terrestrial broadcast receiver subsystem may include an antenna for receiving an aiding signal communicating aiding information including broadcaster locations, channel assignments and timing characteristics and parameters. Alternatively, or in addition, the terrestrial broadcast receiver may include an aiding information interface for receiving aiding information including broadcaster locations, channel assignments and timing characteristics and parameters. In this example, aiding information interface is configured to couple the terrestrial receiver to a landside aiding server or network.

In a further illustrative embodiment, the diversity receiver further comprises a second receiver subsystem comprising a GNSS receiver operatively coupled via third link means to the CPP. The second receiver subsystem provides a second stable time and frequency reference and position information to the CPP via the third link means. The GNSS receiver may include an aiding information interface for reception of a GNSS aiding signal providing satellite constellation orbital information and other information used to correct for clock drift, atmosphere signal delay, and ionosphere delay, which are used to enhance the sensitivity, time-to-first-fix TFFF and accuracy of a GNSS receiver's location estimate and the time and frequency references. In addition, the GNSS receiver may include an aiding information interface for receiving aiding information from a landside aiding server or network. Moreover, the GNSS receiver may be configured to operate in a static timing mode in which a time and frequency reference are provided when the sensor knows its location, perhaps from a manual survey, and only one GNSS satellite signal is available, and the CPP may be configured to designate a primary and secondary receiver subsystem based on time-to-fix, signal quality, or operator preference.

In yet a further illustrative embodiment, the diversity receiver includes a reference oscillator operatively coupled to the CPP, and the CPP is configured to communicate with the first and second receiver subsystems, to receive stable time signals from the receiver subsystems, and to use at least one of the time signals to discipline the reference oscillator. In addition, the CPP is further configured either to select one of the first and second receiver subsystems or to hybridize the information provided by the receiver subsystems to create an optimized time reference, frequency reference and timestamp to be provided to the sensor.

Figure 10:
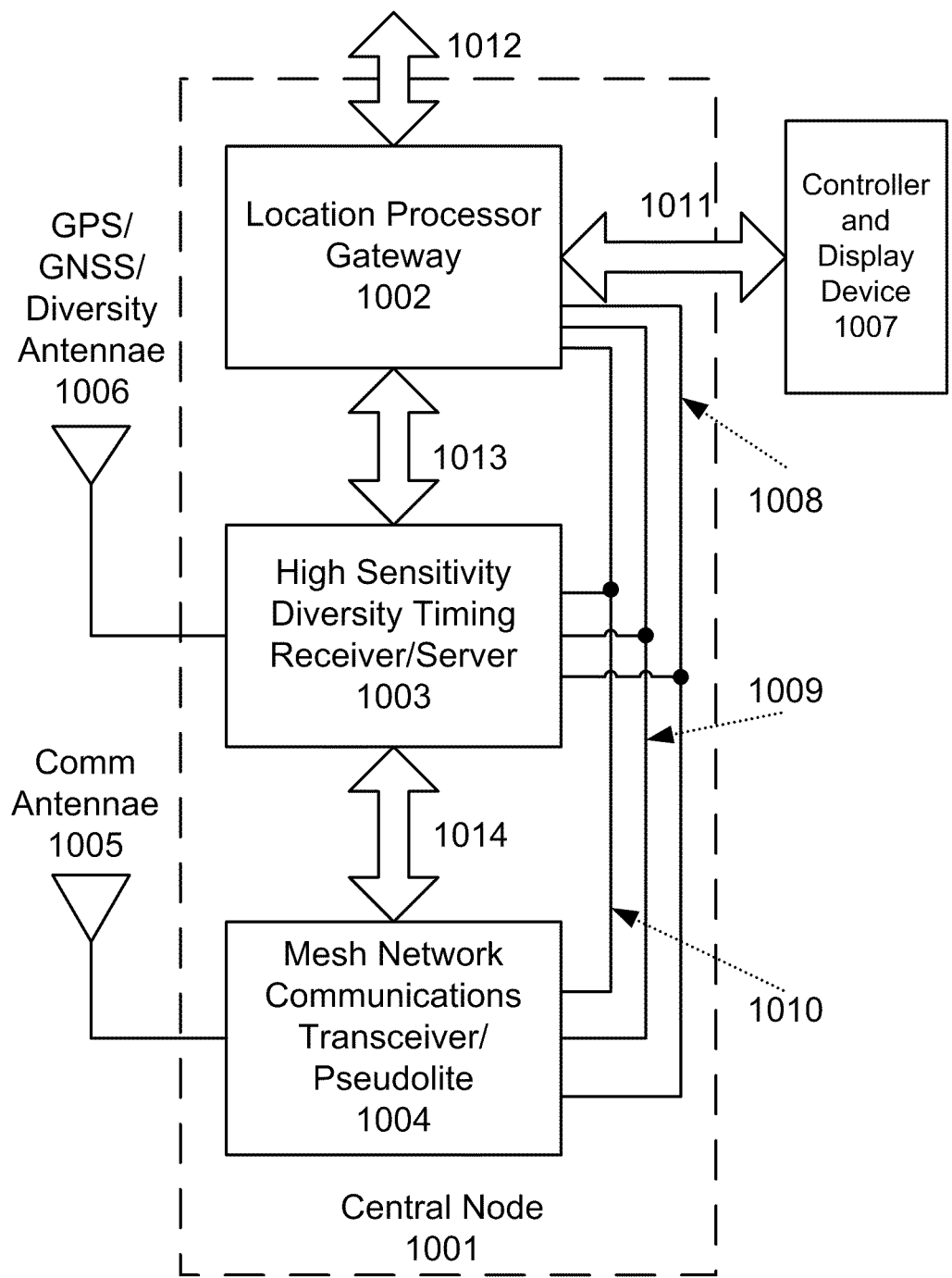
FIG. 10 depicts the functional elements within an embodiment of a central node.

FIG. 10 schematically details the major functional subsystems of the central node 1001. The main function of the central node 1001 is the primary controller of the sensor stations in the geolocation network. The central node 1001 is very similar in design to a sensor station in that it possesses a high sensitivity diversity timing receiver 1006, timing server 1003 and mesh network communications transceiver/pseudolite elements 1004.

The location processor gateway (LPG) subsystem 1002 is unique to the central node 1001 that maintains communication with each sensor in the geolocation network via either a direct wireless connection or via relays through other sensor stations if it does not have a direct wireless connection. The LPG 1002 monitors the state of each of the deployed sensor stations to determine if they are:
  Reference sensor or blind sensor
  Direct connection or Indirect connection to the central node
  Direct connection to three or more reference sensors
  Know their location
  Are time synchronized
  Status of Receiver and Signal processing resources The location processor gateway 1002 initiates the geolocation of a specific transmitter via a message from its external interface from another external node or from any of the sensor stations in the network via a self-triggering mechanism. For example, a signal level threshold can be set of a particular RF channel for one or more of the sensor stations. If the signal level detected by the sensor stations exceeds the preset threshold at a sensor then a message is sent to the central node to trigger a geolocation of that transmitter. The location processor gateway of the central node will task the appropriate sensor stations based upon their status.

Whether a geolocation is triggered externally or internally the central node 1001 will task the appropriate sensor stations to acquire the transmitter-of-interest's signal, measure the collected signal characteristics and provide the collected signal and timing information back to the central node 1002. The central node 1001 will calculate the location of the transmitter-of-interest and provide the calculated location to an external entity, display it locally and/or record it in a database (not shown) for future post-processing.

Location determination and time synchronization of a blind sensor can be accomplished with knowledge of the distance the blind sensor is from three or more reference sensor stations. With this information a set of mathematical equations simultaneously expressing these distances as a function of the location of the blind sensor can be solved. These distances can be expressed mathematically for N reference sensor stations, where N is greater than 3, as:

$$d_1 = \sqrt{(x_1 - x)^2 + (y_1 - y)^2 + (z_1 - z)^2}$$
$$d_2 = \sqrt{(x_2 - x)^2 + (y_2 - y)^2 + (z_2 - z)^2}$$
$$\vdots$$
$$d_N = \sqrt{(x_N - x)^2 + (y_N - y)^2 + (z_N - z)^2}$$

The locations of the reference sensor stations are $(x_i, y_i, z_i)$ for i from 1 to N. The location of the blind sensor is (x, y, z). There are many ways to solve this set of equations simultaneously. One common way is to minimize the sum of the squared difference between the measured distance, $d_i$, and the model for the distance which is a function of the location (x, y, z). The quantity, i.e. metric, to be minimized to determine (x, y, z) is expressed mathematically as:

$$\sum_{i=1}^{N} \left( d_i - \sqrt{(x_i - x)^2 + (y_i - y)^2 + (z_i - z)^2} \right)^2$$

Graphically, the solution to this equation can be visualized as the unique intersection of three spheres centered on each of the reference sensor stations with a radius given as the distance from the respective reference sensor to the blind sensor.

The distance a blind sensor is from a reference sensor can be determined by measuring the propagation time from a signal transmitted by the reference sensor to the blind sensor. This is the technique that GNSS (Global Navigation Satellite System(s), such as the existing United States Global Positioning System (GPS)) terminals use where the GNSS satellites, and pseudolites, embed their location and time of transmission into the wireless waveform that is transmitted to the terminal. The GNSS terminal then notes the time, with respect to its local clock, that the transmission was received. Since radio waves propagate at constant velocity the measured propagation time can be converted to a distance by multiplying by the speed of light, denoted c, which is the velocity of propagation of radio waves. This converted distance would be the correct distance from the satellite to the terminal if the satellite clock and terminal clock were time synchronized. But they are not and, therefore, a clock offset must be added to the variables that must be solved for from the measurements. This clock offset is common to all of the measurements. Additionally, solving for the clock offset effectively time synchronizes the blind sensor to the reference sensor stations. The equations are:

$$cT_1 = \sqrt{(x_1 - x)^2 + (y_1 - y)^2 + (z_1 - z)^2} + C_o$$
$$cT_2 = \sqrt{(x_2 - x)^2 + (y_2 - y)^2 + (z_2 - z)^2} + C_o$$
$$\vdots$$
$$cT_N = \sqrt{(x_N - x)^2 + (y_N - y)^2 + (z_N - z)^2} + C_o$$

Again, there are many ways these equations can be solved simultaneously to solve for the position of the blind sensor (x, y, z) and the local clock offset $C_o$. One common way is to minimize the sum of the squared differences between the measured distances plus clock offset, $cT_i$, and the model for the distance which is a function of the location (x, y, z) of the sensor and its clock offset $C_o$. The quantity, i.e. metric, to be minimized to determine (x, y, z) and $C_o$ is expressed mathematically as:

$$\sum_{i=1}^{N} \left( cT_i - \sqrt{(x_i - x)^2 + (y_i - y)^2 + (z_i - z)^2} - C_o \right)^2$$

Some blind sensor stations may not have direct wireless backhaul connections to three or more reference sensor stations. In this event they are described as "deficient". However, the location of a deficient (a deficient sensor station is a blind sensor station with the added limitation of less than 3 radio connections) may still be determined and its time synchronized to the geolocation network by receiving wireless backhaul transmissions from other sensor stations and measuring the transmission time.

Figure 11:
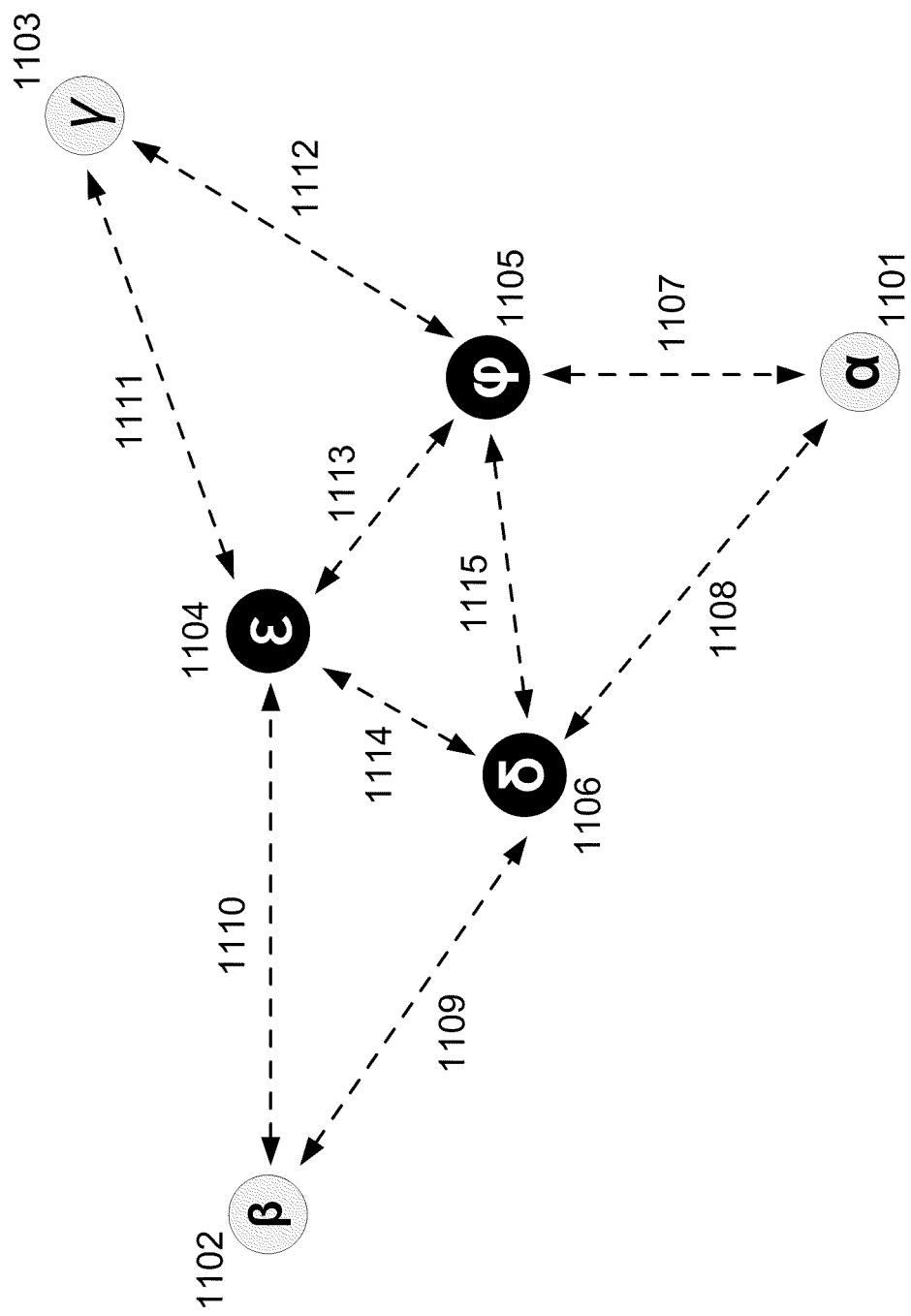
FIG. 11 depicts the mathematical basis for the location determination and time synchronization of a blind or deficient sensor station.

This deficient sensor scenario is depicted in FIG. 11 for the two dimensional TDOA case. Additional sensor stations and/or specialized antenna equipment is needed in the cases where a 3-dimensional location is desired or a hybrid TDOA/AoA technique is used.

In FIG. 11, the reference sensor stations are depicted as a group 1101 1102 1103. The wireless connections between sensor stations, the wireless backhaul, is also shown 1107 1108 1109 1110 1111 1112 1113 1114 1115. Using FIG. 11 to illustrate, the total number of sensor stations in the geolocation network is six and there are three reference sensor stations and three blind sensor stations. Each deficient sensor makes a transmission time measurement from every sensor that it has a direct connection to as shown in the FIG. 11. Reference sensor clock offsets will be zero.

For example, sensor "δ" 1106 is deficient and has direct connections 1108 1109 to reference sensor stations "α" 1101 and "β" 1102 and direct connections 1114 1115 to deficient sensor stations "ε" 1104 and "φ" 1105. Thus, four measurements can be made with this sensor 1106 and an equation derived for each relating the location(s) and clock offset(s). They are:

$$cT_{\alpha,\delta} = \sqrt{(x_\alpha - x_\delta)^2 + (y_\alpha - y_\delta)^2} + C_\delta$$

$$cT_{\beta,\delta} = \sqrt{(x_\beta - x_\delta)^2 + (y_\beta - y_\delta)^2} + C_\delta$$

$$cT_{\epsilon,\delta} = \sqrt{(x_\epsilon - x_\delta)^2 + (y_\epsilon - y_\delta)^2} + C_\delta - C_\epsilon$$

$$cT_{\phi,\delta} = \sqrt{(x_\phi - x_\delta)^2 + (y_\phi - y_\delta)^2} + C_\delta - C_\phi$$

Since sensor stations "α" 1101 and "β" 1102 are reference sensor stations their locations, $(x_\alpha, y_\alpha)$ and $(x_\beta, y_\beta)$, are known and their clock offsets are zero. Sensor stations "δ" 1106, "ε" 1104 and "φ" 1105 are deficient sensor stations so their locations, $(x_\delta, y_\delta)$, $(x_\epsilon, y_\epsilon)$, $(x_\phi, y_\phi)$, are unknown as well as their clock offsets $C_\delta$, $C_\epsilon$, and $C_\phi$. Note, there are 9 unknowns in this set of four equations/measurements. There are not enough equations to determine uniquely the unknowns. This is remedied by making measurements with deficient sensor stations "ε" 1104 and "φ" 1105 with the sensor stations that they have direct wireless backhaul connections to. Doing so will yield eight more equations, some redundant, but will not introduce any more unknowns thereby providing sufficient information for solving for the unknowns uniquely.

There are many ways this set of equations can be solved simultaneously for the unknowns. One common way is to minimize the sum of the squared differences between the measured distance(s) plus clock offset(s), $cT_{i,j}$ and the model for the distance which is a function of the locations $(x_j, y_j)$ and clock offset(s) $C_j$. Mathematically, when there is a total quantity of M+N sensor stations, a quantity of M reference sensor stations and a quantity of N deficient sensor stations, this metric to be minimized can be written:

$$\sum_{i=M+1}^{M+N} \sum_{j \in P(i)} \left( cT_{i,j} - \sqrt{(x_j - x_i)^2 - (y_j - y_i)^2} - C_i + C_j \right)^2$$

where $j \in P(i)$ represents the set of sensor stations j that sensor i has direct wireless backhaul connection to.

Figure 12:
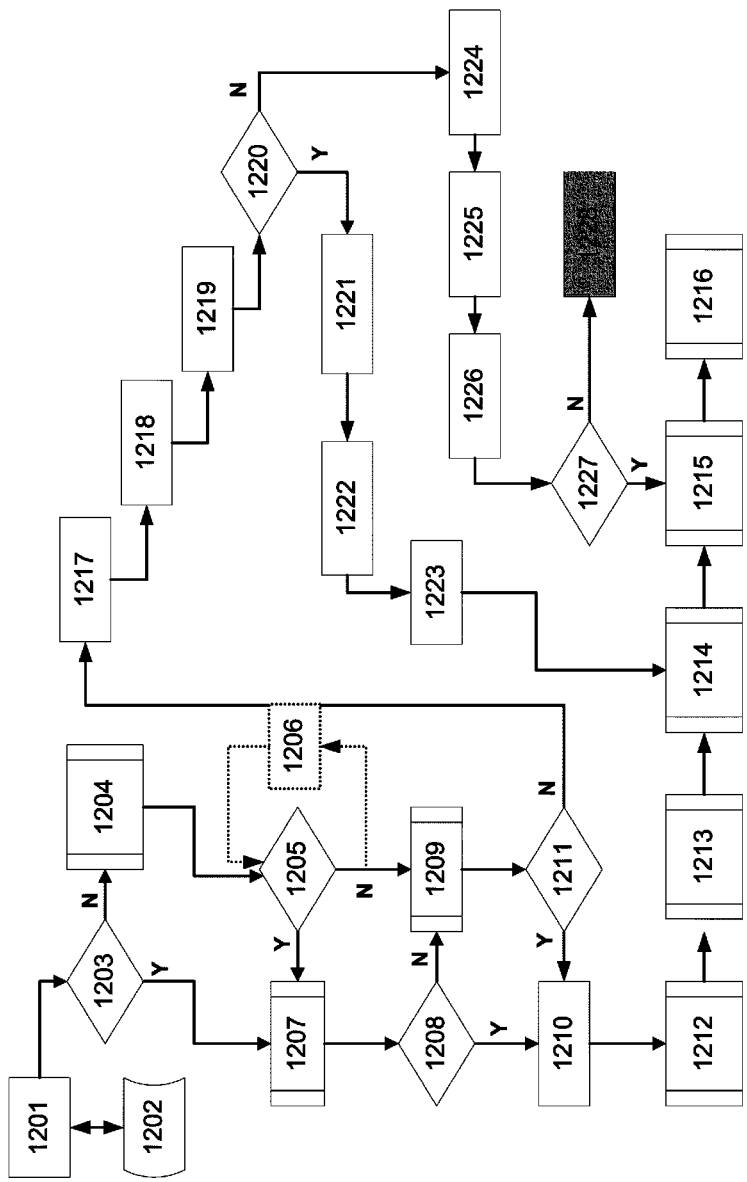
FIG. 12 shows an example of the initialization of a sensor station in the geolocation network.

FIG. 12 depicts an example of sensor station initialization. The sensor station comes online 1201 and checks for stored configuration data 1202. The stored configuration data 1202 may be a static location or a last known location. The availability or validity of the last known location is tested 1203.

If the stored configuration data is deemed valid, then the sensor station attempts to determine the current system time 1207 from available satellite (e.g. the GPS system/WAAS) broadcasts or terrestrial navigation broadcasts. If the stored configuration data tests as invalid (flagged by operator, aged, incomplete, not entered, etc.), then the sensor station will attempt to self locate using its location receiver and any available satellite broadcasts 1204. If no valid location can be obtained 1205 from the stored configuration or via the satellite and terrestrial navigation broadcasts, then alternative location means 1209 are attempted. Alternative location means 1209 includes both wireless means (such as using commercial high-definition-television (HDTV) broadcasts or/and with other terrestrial beacons) or requesting manual entry of sensor station location. Optionally, the sensor station may acquire assistance information and retry self-location using satellite broadcasts 1206 (Assisted-Global Navigation Satellite System positioning (A-GNSS)) and terrestrial navigation broadcasts (Wide Area Augmentation System (WAAS)).

If the sensor station location can be found using stored configuration data, satellite and/or terrestrial navigation broadcasts, or alternative location means, and it has achieved time synchronization the sensor station can be declared a reference station 2010, otherwise the station must be declared a blind station 1217 with no knowledge of its own location or time synchronization to the geolocation network.

If declared a reference station, the sensor station initializes its wireless transceiver and scans for other sensor stations 1212. All other stations discovered are then setup with direct connections 1213. The sensor station then 1214 connects the central node. The central node assesses 1215 the geolocation resource status of the sensor station (e.g. the accuracy of self-location, the signal quality of direct connections). The central node then declares the sensor station online 1216 and ready for participation in location attempts.

If the sensor station was declared 1217 a blind sensor, the blind sensor station will then initialize 1218 its wireless transceiver and scan for other sensor stations. Any stations discovered by the blind sensor are then setup with direct connections 1219. The blind sensor polls the discovered sensor stations for any that have been declared as reference sensor stations.

If a direct connection exists to three or more reference stations and timing references and location of each reference station is therefore known, then the blind sensor will receive the signals from the reference sensor stations 1221 and attempt to self locate using the signaling with the reference stations 1222. If the blind sensor successfully locates itself using the reference station signaling, then the blind sensor declares itself a reference sensor 1223. The reference sensor then establishes a connection to the central node 1214. The central node assesses 1215 the geolocation resource status of the sensor station. The central node then declares the sensor station online 1216 and ready for participation in location attempts.

If a sensor station has been declared blind 1217, can initialize a wireless backhaul 1218 and establish direction connections to other sensor stations 1219 but not to the three or more reference stations required for self-location 1220, then the blind sensor will measure all connections 1224 and establish a connection to the central node 1225. The blind sensor station will then provide the central node with measurements for each direct connection 1226. If the central node, using its knowledge of the timing and location of each sensor station, cannot develop a location and time-offset for the blind sensor station, that station is declared offline 1228. If a location and time-offset can be determined for the blind station, then the central node will assess the geolocation resource status 1215 for the sensor station. The central node then declares the sensor station online 1216 and ready for participation in location attempts.

CONCLUSION

The true scope the present invention is not limited to the presently preferred embodiments disclosed herein. Accordingly, except as they may be expressly so limited, the scope of protection of the following claims is not intended to be limited to the specific embodiments described above.

I claim:

1. A system for geo-locating transmitters of interest, the system comprising:
a network comprising a plurality of geographically dispersed sensor stations, said network of geographically dispersed sensor stations including reference sensor stations and one or more blind sensor stations, wherein the one or more blind sensor stations are configured to measure characteristics of a signal transmitted by a wireless transmitter to be located and do not have knowledge of their own location and are not time synchronized, and wherein at least three sensor stations are at a known location and are synchronized with a reference clock, said at least three sensor stations being useful as the reference sensor stations; and a central node configured to control the sensor stations;

wherein the one or more blind sensor stations are configured for communication with the central node via a backhaul communications network;

wherein the backhaul communications network is configured to permit wireless communications among the sensor stations and central node;

wherein the system is configured such that said at least three reference sensor stations transmit a wireless communications waveform to at least one blind sensor station, and the at least one blind sensor station is synchronized and geo-located based on its reception of the wireless communications waveform;

wherein each of said plurality of geographically dispersed sensor stations comprises first and second receivers, and a transceiver;

wherein the first receiver comprises a high sensitivity diversity timing receiver configured to receive GNSS signals from satellites above the earth or from terrestrial broadcast stations, to enable the determination of the location of the sensor station and to provide time and frequency synchronization for the sensor station when these signals are available;

wherein the second receiver comprises a multichannel tunable wideband digital receiver and signal processor system configured to receive radio frequency (RF) signals from wireless devices to be located, to process said RF signals, and to provide timing and/or power measurement results to the central node; and wherein the transceiver comprises a communications transceiver configured to provide communications between the sensor station and other sensor stations and the central node.

2. A system as recited in claim 1, wherein the at least one blind sensor station is configured to receive and determine the time of arrival (TOA) of the wireless communications waveforms broadcast by the at least three reference sensor stations.

3. A system as recited in claim 2, further comprising a processor associated with the at least one blind sensor station, wherein the processor is configured to use reference sensor station geo-location information and TOA information for geo-location and time synchronization of the at least one blind sensor station.

4. A system as recited in claim 3, wherein the processor associated with the at least one blind sensor station has access to a database of reference sensor station geo-location information.

5. A system as recited in claim 4, wherein the reference sensor station geo-location information is encoded in the wireless communications waveforms broadcast by the at least three reference sensor stations.

6. A system as recited in claim 1, wherein the at least three reference sensor stations are configured to broadcast a wireless communications waveform in which a time of transmission is encoded.

7. A system as recited in claim 1, wherein the system is further configured to permit a blocked sensor station to communicate with the central node via said backhaul communications network and at least one other sensor station.

8. A system as recited in claim 1, wherein the plurality of sensor stations includes portable and fixed sensor stations.

9. A system as recited in claim 1, wherein the central node comprises a display device and external interface.

10. A system as recited in claim 1, wherein the system is further configured to geo-locate transmitters of interest using power measurements made by sensor stations that have been geo-located.

11. A system as recited in claim 1, wherein the system is further configured to geo-locate transmitters of interest using time based measurements made by sensor stations that have been geo-located and synchronized.

12. A system as recited in claim 1, wherein the system is further configured to geo-locate blind sensor stations via reception of terrestrial broadcast signals.

13. A system as recited in claim 12, wherein the terrestrial broadcast signals comprise high definition television (HDTV) signals.

14. A system as recited in claim 1, wherein the system is further configured to permit any sensor station to trigger a location and to act as the central node.

15. A method for geo-locating transmitters of interest using a network of geographically dispersed sensor stations, said network of geographically dispersed sensor stations including reference sensor stations ad one or more blind sensor stations, wherein the one or more blind sensor stations are configured to measure characteristics of a signal transmitted by a wireless transmitter to be located, wherein the one or more blind sensor stations are configured for communication with a central node via a backhaul communications network, and wherein the one or more blind sensor stations do not have knowledge of their own location and are not time synchronized, the method comprising:

determining the locations of at least three sensor stations ad synchronizing said at least three sensor stations with a reference clock, said at least three sensor stations being useful as reference sensor stations;

employing wireless communications via the backhaul communications network to synchronize and geo-locate at least one blind sensor station, said wireless communications including broadcast by said reference sensor stations of a wireless communications waveform that is received by the at least one blind sensor station ad used for synchronization and geo-location; and geo-locating at least one transmitter of interest using the network of geographically dispersed sensor stations, including the at least one blind sensor station;

wherein each of said plurality of geographically dispersed sensor stations comprises first and second receivers, and a transceiver;

wherein the first receiver comprises a high sensitivity diversity timing receiver configured to receive GNSS signals from satellites above the earth or from terrestrial broadcast stations, to enable the determination of the location of the sensor station and to provide time and frequency synchronization for the sensor station when these signals are available;

wherein the second receiver comprises a multichannel tunable wideband digital receiver and signal processor system configured to receive radio frequency (RF) signals from wireless devices to be located, to process said RF signals, and to provide timing and/or power measurement results to the central node; and wherein the transceiver comprises a communications transceiver configured to provide communications between the sensor station and other sensor stations and the central node.

16. A method as recited in claim 15, wherein the at least one blind sensor station receives and determines the time of arrival (TOA) of the wireless communications waveforms broadcast by the at least three reference sensor stations.

17. A method as recited in claim 16, further comprising employing a location processor associated with the at least one blind sensor station to use reference sensor station geo-location information and TOA information for geo-location and time synchronization.

18. A method as recited in claim 17, wherein the location processor accesses a database of reference sensor station geo-location information.

19. A method as recited in claim 18, wherein the reference sensor station geo-location information is encoded in the wireless communications waveforms broadcast by the at least three reference sensor stations.

20. A method as recited in claim 15, wherein the at least three reference sensor stations broadcast a wireless communications waveform in which a time of transmission is encoded.

21. A method as recited in claim 15, wherein a deficient sensor station communicates and synchronizes with the central node via said backhaul communications network and at least one other sensor station.

22. A method as recited in claim 15, wherein the plurality of sensor stations includes portable and fixed sensor stations.

23. A method as recited in claim 15, wherein power measurements made by sensor stations that have been geo-located and synchronized are used to geo-locate transmitters of interest.

24. A method as recited in claim 15, wherein time based measurements made by sensor stations that have been geo-located and synchronized are used to geo-locate transmitters of interest.

25. A method as recited in claim 15, wherein terrestrial broadcast signals are used to geo-locate blind sensor stations.

26. A method as recited in claim 25, wherein the terrestrial broadcast signals comprise high definition television (HDTV) signals.

27. A method as recited in claim 15, wherein any sensor station is permitted to trigger a location and to act as the central node.

28. A method as recited in claim 15, wherein a location trigger is received from an external entity.

29. A method for geo-locating transmitters of interest using a network of geographically dispersed sensor stations, said network of geographically dispersed sensor stations including reference sensor stations and at least one deficient sensor station, wherein the deficient sensor station is at an unknown location, is not synchronized with the reference sensor stations, and does not have a radio connection to three or more reference sensor stations, comprising:

determining the locations of at least three sensor stations and synchronizing said at least three sensor stations with a reference clock, said at least three sensor stations being useful as reference sensor stations; and employing wireless communications via a backhaul wireless communications network to synchronize and geo-locate a first deficient sensor station, said wireless communications including broadcast by said reference sensor stations of a wireless communications waveform that is received by the first deficient sensor station and used for synchronization and geo-location;

wherein each of said plurality of geographically dispersed sensor stations comprises first and second receivers, and a transceiver;

wherein the first receiver comprises a high sensitivity diversity timing receiver configured to receive GNSS signals from satellites above the earth or from terrestrial broadcast stations, to enable the determination of the location of the sensor station and provide time and frequency synchronization for the sensor station when these signals are available;

wherein the second receiver comprises a multichannel tunable wideband digital receiver and signal processor system configured to receive radio frequency (RF) signals from wireless devices to be located, to process said RF signals, and to provide timing and/or power measurement results to a central node; and wherein the transceiver comprises a communications transceiver configured to provide communications between the sensor station and other sensor stations and the central node.

30. A method as recited in claim 29, wherein the first deficient sensor station makes a transmission time measurement for every sensor station to which it has a direct connection via the backhaul wireless communications network, including one or more reference sensor stations and at least one other deficient sensor station.

31. A method as recited in claim 30, wherein the at least one other deficient sensor station makes transmission time measurements for every sensor station to which the at least one other deficient sensor station is directly connected via the backhaul wireless communications network.

* * * * *